UNITED STATES PATENT OFFICE.

AUSTIN B. BRAY, OF GLOUCESTER, MASSACHUSETTS.

CAKE OF CURED FISH AND METHOD OF PREPARING.

SPECIFICATION forming part of Letters Patent No. 326,099, dated September 15, 1885.

Application filed March 28, 1885. (Specimens.)

*To all whom it may concern:*

Be it known that I, AUSTIN B. BRAY, of Gloucester, in the county of Essex and Commonwealth of Massachusetts, have invented an Improved Method of Preparing Cured or Salted Fish for the market as an article of food, of which the following is a specification.

My invention consists in preparing cured or salted fish, in the manner hereinafter described, so that it will be in a compact convenient form for use, and will keep in a sweet and edible condition for a great length of time, and be always ready for cooking without further preparation.

My improved method is as follows: I take cured or salted fish, remove the skin and the bones thoroughly, and then disintegrate the flesh by shredding, grinding, or other convenient way of reducing it to small pieces. When in this condition, I apply heated water to it and immediately thereafter submit it to sufficient pressure in molds to expel the water, and compact the fish and press the small pieces closely together, thereby forming the mass into cakes or blocks, the size of which can be regulated, as desired, from one pound upward by the size of the molds employed.

Subjecting the disintegrated fish to the action of hot water sufficiently dissolves the gelatine in the fibers to cause the small pieces of flesh to adhere to one another when they are firmly pressed together.

Water heated to any temperature above 100° will produce the result, and even steam may be used; but I have found that the most successful and satisfactory results are obtained by the use of water heated to a temperature between 120° and 200°. If steam is used, the fish will be partially cooked thereby, which I do not aim to do.

When fish has been treated and prepared in the manner above described, the salt which was used in curing it will not collect upon the outside of the cakes or blocks, as it does upon salt fish prepared by any of the methods heretofore in use, and the fish will not turn red and become unfit for use under the same conditions that such other fish will.

These cakes or blocks of fish prepared according to my improved method can be boiled or otherwise cooked in the same manner that whole fish or unbroken slices thereof can be cooked, and they will retain their form and not become broken up so readily as slices cut from a whole fish.

What I claim is—

1. The method of preparing cured or salted fish for the market by subjecting the disintegrated flesh of such fish to the action of hot water and then forming it into cakes or blocks under pressure, substantially as described.

2. As a commercial article of food, cakes of fish composed of small pieces or shreds of cured or salted fish stuck together by their inherent gelatine and pressed into compact masses, substantially as described.

AUSTIN B. BRAY.

Witnesses:
CHAS. H. SWAN,
JOHN T. KENNERK.